United States Patent [19]
Kuboniwa

[11] Patent Number: 6,131,036
[45] Date of Patent: Oct. 10, 2000

[54] SUBSCRIBER UNIT FOR A SUBSCRIBER RADIO COMMUNICATION SYSTEM

[75] Inventor: Osamu Kuboniwa, Tokyo, Japan

[73] Assignee: NEC Corporation, Tokyo, Japan

[21] Appl. No.: 09/062,166

[22] Filed: Apr. 20, 1998

[30] Foreign Application Priority Data

Apr. 21, 1997 [JP] Japan ............................. 9-103187

[51] Int. Cl.[7] ....................................... H04Q 7/20
[52] U.S. Cl. ................................ 455/466; 455/445
[58] Field of Search .................... 455/432, 433, 455/435, 445, 446, 560, 562, 466, 414

[56] References Cited

U.S. PATENT DOCUMENTS 5,195,090  3/1993  Bolliger et al. .................. 455/560
5,353,331  10/1994  Emery et al. .................... 455/445

FOREIGN PATENT DOCUMENTS 60-64564   4/1985   Japan .
6-326786   11/1994  Japan .

OTHER PUBLICATIONS

"Personal Handy Phone System ARIB Standard, version 2 RCR STD–28", p. 336.

Primary Examiner—Nguyen Vo
Assistant Examiner—Sam Bhattacharya
Attorney, Agent, or Firm—Foley & Lardner

[57] ABSTRACT

To provide a subscriber unit applied to a subscriber radio communication system wherein internal parameters of the subscriber unit can be easily and correctly set optionally without providing any manipulation switch or connecting any manipulation console to the subscriber unit, the subscriber unit comprises: a communication module for transferring data to be exchanged between a base unit and a subscriber terminal; a parameter setting unit for setting internal parameters of the subscriber unit according to contents of parameter setting data; and a data switching unit for discriminating a special calling signal to require setting of the internal parameters, and transferring data following the special calling signal to the parameter setting unit as the parameter setting data until a setting end code is found in the data.

9 Claims, 1 Drawing Sheet

SUBSCRIBER UNIT FOR A SUBSCRIBER RADIO COMMUNICATION SYSTEM

BACKGROUND OF THE INVENTION

The present invention relates to a subscriber unit such as a DSU (Digital Service Unit) used for a subscriber radio communication sytsem such as a WLL (Wireless Local Loop), and particularly to a device for setting internal parameters of the subscriber unit.

FIG. 2 is a schematic diagram illustrating a conventional system configuration of the subscriber radio communication system wherein subscribers exchange data with a base station by way of radio signals.

Referring to FIG. 2, there is equipped, at the subscriber side, a subscriber unit 22 having switches 26, such as dip-switches, and connected with a subscriber terminal 20, or a subscriber unit 23 connected to a console, such as a personal computer, together with a subscriber terminal 21.

At the base station side, there is provided a base unit 24, such as an OCU (Office Channel Unit) accommodated in a SLT (Subscriber Line Terminal) 25.

In the subscriber radio communication system, different data transmission modes are usually applied to data exchange between the base unit 24 and its upper unit, according to kinds of the subscriber terminals 20 and 21, that is, according to whether they are ordinary telephone terminals or digital terminals such as a facsimile terminal or a data modem. Therefore, the subscriber units 22 and 23 are to be designed to inform the base unit 24 of the kinds of the respective subscriber terminals 20 and 21 connected thereto, and, for that purpose, respective kinds of the subscriber terminals 20 and 21 are to be beforehand set in the internal parameters of the subscriber units 22 and 23, respectively.

For setting such internal parameters as above described, for example, the switches 26 or the console 27 has been provided to the subscriber unit 22 or 23.

In other words, the internal parameters of the subscriber units are set by manipulating switches provided therein, such as the switches 26 of the subscriber unit 22 of FIG. 2, or by manipulating consoles connected thereto, such as the console 27 connected to the subscriber unit 23 of FIG. 2, in the conventional subscriber radio communication system.

Besides the kind of subscriber terminal as above described, there are certain internal parameters which have been set in the subscriber unit 22 or 23 by way of the switches 26 or the console 27. An example of them concerns a number display service for displaying a number, a telephone number, for example, of the other subscriber terminal with which the subscriber terminal 20 or 21 is communicating.

In a standard proposed in a document entitled "Personal Handy Phone System ARIB Standard, version 2, RCR STD-28", by ARIB (Association of Radio Industries and Businesses), it is defined at page 336, concerning the above number display service, that whether the subscriber unit informs the base unit of the number of subscriber terminal or not can be selected optionally by the subscriber. Here, also, the internal parameter of the subscriber unit concerning whether the subscriber unit informs a receiver-side subscriber terminal of the number of the transmitter-side subscriber terminal or not should be set optionally according to subscriber's selection, and the parameter setting has been performed conventionally by way of the switches 26, for example, of the subscriber unit 22, or the console 27, for example, connected to the subscriber unit 23.

However, there are demerits as follows in these conventional methods of internal parameter setting, such as by manipulating the switches 26 of the subscriber unit 22 or by manipulating the console 27 connected to the subscriber unit 23.

In the method of parameter setting by manipulating the switches 26 of the subscriber unit 22, for example, the switches 26, which are designed to be manipulated easily, may be turned because of an unexpected shock received by the subscriber unit 22, or may be set unexpectedly by an incorrect manipulation. There is also a problem of cost. The switches 26 themselves increase the number of parts and, consequently, the production cost of the subscriber unit 22. Furthermore, the element number of the switches 26 and their usage are fixed when the subscriber unit 22 is designed. Therefore, it is very difficult to deal with new parameters which become necessary to be set after shipping of the subscriber unit 22.

On the other hand, in the method of parameter setting by way of the console 27, for example, the console 27 must be connected to the subscriber terminal 23 for performing the parameter setting. Therefore, troublesome effort is imposed to the subscriber for connecting the console 27 to the subscriber unit 23 each time when setting of the internal parameters of the subscriber unit 23 is to be changed, in addition to the necessity of preparing the console 27 even when it is not used but for the parameter setting.

SUMMARY OF THE INVENTION

Therefore, a primary object of the present invention is to provide a subscriber unit applied to a subscriber radio communication system such as the WLL, wherein internal parameters of the subscriber unit can be easily and correctly set optionally without providing any manipulation switch or connecting any manipulation console to the subscriber unit.

In order to achieve the object, a subscriber unit of the invention comprises:

a communication module for transferring data to be exchanged between a base unit of the subscriber radio communication system and a subscriber terminal connected to the subscriber unit;

a parameter setting means for setting internal parameters of the subscriber unit according to contents of parameter setting data; and a data switching means for discriminating whether a calling signal input from the subscriber terminal is an ordinary calling signal to establish a call in the subscriber radio communication system or a special calling signal to require setting of the internal parameters, and transferring data following the special calling signal to the parameter setting means as the parameter setting data without transferring any data to the communication module until a code defined as a setting end code is found in the data when the calling signal input from the subscriber terminal is discriminated to be the special calling signal.

Therefore, internal parameters of the subscriber unit can be easily set optionally without providing any manipulation switch or connecting any manipulation console to the subscriber unit. Further, the internal parameters can be changed only after entering a special calling signal. Therefore, unexpected parameter setting because of incorrect operation or at physical shock can be prevented.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
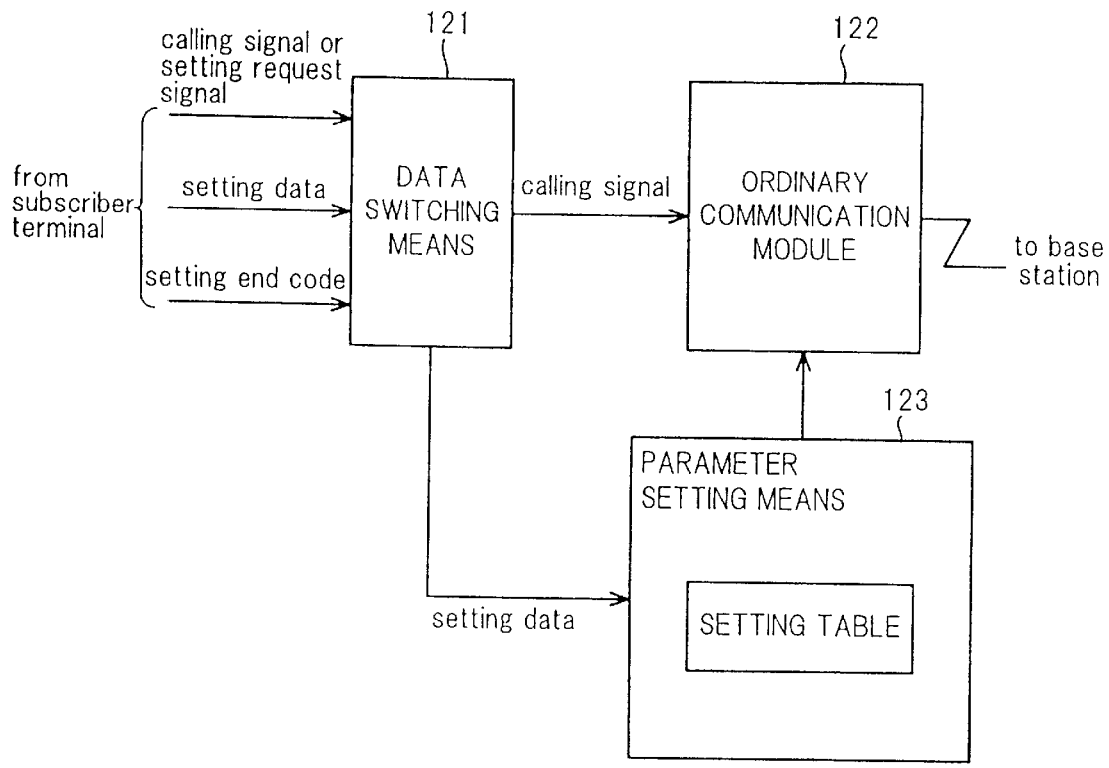
FIG. 1 is a block diagram illustrating an internal configuration of a subscriber unit according to an embodiment of the invention.
Figure 2:
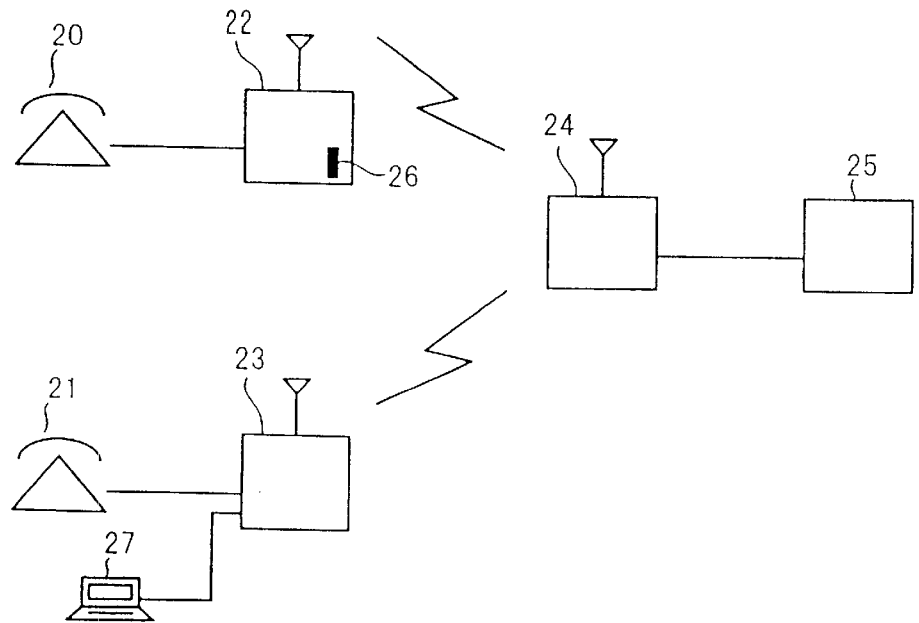
FIG. 2 is a schematic diagram illustrating a conventional system configuration of the subscriber radio communication system.

FIG. 1 is a block diagram illustrating an internal configuration of a subscriber unit according to an embodiment of the invention, which is used in place of the subscriber unit 22 or 23 of FIG. 2. The subscriber unit of FIG. 1 comprises an ordinary communication module 122, a parameter setting means 123 and a data switching means 121 for switching data input from a subscriber terminal connected to the subscriber unit into the ordinary communication module 122 or into the parameter setting means 123.

The data switching means 121 checks whether a calling signal input from the subscriber terminal is an ordinary calling signal, a telephone number, for example, or a setting request signal for requesting parameter setting. When the calling signal is found to be an ordinary calling signal, the calling signal and data following the calling signal are transferred to the ordinary communication module 122 to be transmitted to a base unit such as the base unit 24 of FIG. 2.

On the other hand, when the calling signal is found to be the setting request signal, setting data input from the subscriber terminal following the setting request signal are transferred to the parameter setting means 123 until a setting end signal is input from the subscriber terminal. As to the setting data, one of coded signals each defined according to each parameter setting is input. The parameter setting means 123 analyzes the coded signal received through the data switching means 121 by referring to a setting table prepared therein, for example, for retrieving a required parameter setting indicated by the coded signal, and performs the required parameter setting to the subscriber unit.

The subscriber unit of FIG. 1 operates as follows.

When a subscriber intends to exchange data through the subscriber radio communication system making use of a subscriber terminal, the subscriber enters a calling signal, such as a telephone number, for example, into the subscriber terminal connected to the subscriber unit for establishing a call with a destination terminal.

Receiving the calling signal, the subscriber unit begins to communicate with the base unit and transmits data including information concerning the subscriber terminal itself and concerning services required by the subscriber.

The information concerning the subscriber terminal and the required services is transmitted to the base unit to be referred to for establishing the call by upper units of communication networks such as the ISDN (Integrated Service Digital Network) connected to the base unit.

The subscriber terminal transmits the above information according to internal parameters beforehand set in the subscriber unit. Therefore, the internal parameters of the subscriber terminal should be changed when the kind of the subscriber terminal or the required services are to be changed.

For changing setting of the internal parameters of the subscriber unit of FIG. 1, the subscriber enters the setting request signal, for the first, to the subscriber unit through a subscriber terminal. When the setting request signal is received by the subscriber unit, it is checked by the data switching means 121 and discriminated not to be an ordinary calling signal. Therefore, the switching means 121 switches the data path onto the parameter setting means 123 and waits for following data to be input, instead of beginning to communicate with the base unit by way of the ordinary communication module 122.

Then, the subscriber enters a coded signal for setting internal parameters to indicate the desired information concerning the subscriber terminal itself or the required services, and the setting end signal to accomplish the parameter setting. The parameter setting means 123 of the subscriber terminal changes setting of the internal parameters according to the coded signal transferred through the data switching means 121 referring to the setting table.

Thus, the revised information is transmitted to the base unit at the beginning of each communication after the parameter setting.

Heretofore, the data switching means 121 and the parameter setting means 123 are described referring to FIG. 1 wherein they are represented by functional blocks. However, they may be implemented with software prepared in a nonvolatile memory such as an EEPROM and operating in a CPU provided in the subscriber unit.

In the following paragraphs, some concrete examples of the above operation will be described.

The first example is a procedure performed when the kind of the subscriber terminal is to be changed.

When a subscriber intends to exchange data through the subscriber radio communication system making use of a subscriber terminal, the subscriber enters a calling signal, such as a telephone number, for example, into the subscriber terminal connected to the subscriber unit for establishing at call with a destination terminal.

Receiving the calling signal, the subscriber unit begins to communicate with the base unit and transmits data including information that the subscriber terminal is a telephone terminal, when internal parameters are set for the telephone terminal.

Here, if the subscriber intends to change the subscriber terminal from a telephone terminal to a facsimile terminal, the data transfer mode in the upper networks than the base unit must be changed. Therefore, the subscriber should change the internal parameters of the subscriber unit so that the subscriber unit can inform the base unit that the subscriber terminal is a facsimile terminal. For that purpose, the subscriber unit according to the embodiment comprises the data switching means 121 which can discriminate a special calling signal "#*#*#*#*#*", for example, (which may be any other code than those used for ordinary telephone calls) as the setting request signal and another code "#", for example, as the setting end signal, and the parameter setting means 123 which has the setting table wherein a coded signal "111", for example, is associated with the parameter setting for indicating that the subscriber terminal is a facsimile terminal.

For changing setting of the internal parameters of the subscriber unit to indicate that the subscriber terminal is a facsimile terminal, the subscriber enters the setting request signal "#*#*#*#*#*", for the first, to the subscriber unit through a subscriber terminal. When the setting request signal "#*#*#*#*#*" is received by the subscriber unit, it is checked by the data switching means 121 and discriminated not to be an ordinary calling signal. Therefore, the data switching means 121 switches the data path onto the parameter setting means 123 and waits for following data to be input, instead of beginning to communicate with the base unit by way of the ordinary communication module 122.

Then, the subscriber enters the coded signal "111" for setting internal parameters to indicate that the subscriber terminal is a facsimile terminal, followed by the setting end signal "#". The parameter setting means 123 of the subscriber terminal changes setting of the internal parameters so as to indicate that the subscriber terminal is a facsimile terminal, according to the coded signal "111" transferred through the data switching means 121 referring to the setting table.

Thus, the revised information indicating that the subscriber terminal is a facsimile terminal is transmitted to the base unit at the beginning of each communication after the parameter setting.

The second example is a procedure performed when setting of the number display service is to be changed.

As beforehand described, it is defined in the ARIB standard that whether the subscriber unit informs the base unit of the number of subscriber terminal or not can be selected optionally by the subscriber.

For enabling the subscriber to select these services optionally, the subscriber unit according to the embodiment comprises the data switching means 121 which can discriminate a special calling signal "#*#*#*#*#*", for example, as the setting request signal and another code "#", for example, as the setting end signal, and the parameter setting means 123 which has the setting table wherein a coded signal "222", for example, is associated with the parameter setting for indicating the subscriber unit to inform the base unit of the telephone number.

For changing setting of the internal parameters of the subscriber unit to inform the base unit of the telephone number, the subscriber enters the setting request signal "#*#*#*#*#*", for the first, to the subscriber unit through a subscriber terminal. When the setting request signal "#*#*#*#*#*" is received by the subscriber unit, it is checked by the data switching means 121 and discriminated not to be an ordinary calling signal. Therefore, the data switching means 121 switches the data path onto the parameter setting means 123 and waits for following data to be input, instead of beginning to communicate with the base unit by way of the ordinary communication module 122.

Then, the subscriber enters the coded signal "222" for setting internal parameters to indicate that the telephone number is to be transmitted to the base unit, followed by the setting end signal "#". The parameter setting means 123 of the subscriber terminal changes setting of the internal parameters so is to inform the base unit of the telephone number, according to the coded signal "222" transferred through the data switching means 121 referring to the setting table.

Thus, the telephone number is transmitted to the base unit at the beginning of each communication after the parameter setting.

As heretofore described, internal parameters of the subscriber unit can be easily set optionally without providing any manipulation switch or connecting any manipulation console to the subscriber unit. Further, the internal parameters can be changed only after entering a special calling signal. Therefore, unexpected parameter setting because of incorrect operation or a physical shock can be prevented in the subscriber unit of the invention.

What is claimed is:

1. A subscriber unit of a subscriber radio communication system; said subscriber unit comprising:

a communication module for transferring data to be exchanged between a base unit of the subscriber radio communication system and a subscriber terminal connected to the subscriber unit;

a parameter setting means for setting internal parameters of the subscriber unit according to contents of parameter setting data; and a data switching means for discriminating whether a calling signal input from the subscriber terminal is an ordinary calling signal to establish a call in the subscriber radio communication system or a special calling signal to require setting of the internal parameters, and transferring data following the special calling signal to the parameter setting means as the parameter setting data without transferring any data to the communication module until a code defined as a setting end code is found in the data when the calling signal input from the subscriber terminal is discriminated to be the special calling signal.

2. A subscriber unit as recited in claim 1; wherein:

the parameter setting data is one of coded signals each defined for each setting of the internal parameters; and the parameter setting means sets the internal parameters according to a retrieval result obtained by referring to a setting table wherein each setting of the internal parameters is listed to be retrieved with each of the coded signals.

3. A subscriber unit as recited in claim 2; wherein a coded signal corresponding to setting the internal parameters for designating a kind of the subscriber terminal is included in the coded signals.

4. A subscriber unit as recited in claim 2; wherein a coded signal corresponding to setting the internal parameters for selecting an option of a required service of the subscriber radio communication system is included in the coded signals.

5. A subscriber unit as recited in claim 1; wherein the ordinary calling signal and the special calling signal sent from the subscriber terminal to the subscriber unit are sent over a same communications path.

6. A subscriber unit as recited in claim 1, wherein only one subscriber terminal is connected to the subscriber unit at any given instant in time.

7. A subscriber unit of a subscriber radio communication system; said subscriber unit comprising:

a communication module that transfers data to be exchanged between a base unit of the subscriber radio communication system and a subscriber terminal connected to the subscriber unit;

a parameter setting unit that sets internal parameters of the subscriber unit according to contents of parameter setting data, the internal parameters being sent to the communication module for transferring the data to be exchanged in a particular format; and a data switching unit that receives a calling signal sent from the subscriber terminal, and for discriminating whether the calling signal is an ordinary calling signal to establish a call in the subscriber radio communication system or a special calling signal to require setting of the internal parameters, the data switching unit transferring data following the special calling signal to the parameter setting unit as the parameter setting data without transferring any data to the communication module until a code defined as a setting end code is found in the data when the calling signal input from the subscriber terminal is discriminated to be the special calling signal.

8. A subscriber unit as recited in claim 7, wherein the ordinary calling signal and the special calling signal are sent from the subscriber terminal to the data switching unit over a same communications path that couples the subscriber terminal with the subscriber unit.

9. A method of reconfiguring a subscriber unit based on a change from a first subscriber terminal previously coupled to the subscriber unit to a second subscriber unit currently coupled to the subscriber unit, the subscriber unit providing an interface between the second subscriber terminal and a base unit of a subscriber radio communications system, the method comprising:

a) after the first subscriber unit has been decoupled from the subscriber unit and the second subscriber unit has been coupled to the subscriber unit, outputting a calling signal to the subscriber unit;

b) determining, by the subscriber unit, whether the calling signal is either a first calling signal or a second calling signal;

c) when the calling signal is determined to be the first calling signal, outputting data following the first calling signal to the base unit in a normal data communications mode;

d) when the calling signal is determined to be the second calling signal, storing data following the second calling signal in a memory of the subscriber unit, as subscriber unit setup data, and not outputting the data to the base unit;

e) when the calling signal is determined to be the second calling signal and after the step d), waiting for an end-of-data code, and when the end-of data code is received, stopping the storing of data in the memory; and f) after the step e), transferring any data received by the subscriber unit sent from the subscriber terminal, to the base unit, in the normal data communication mode utilizing parameters stored in the memory, wherein the parameter used in the step f) correspond to characteristics of the second subscriber terminal.

* * * * *